United States Patent [19]

Zana et al.

[11] Patent Number: 4,814,721
[45] Date of Patent: Mar. 21, 1989

[54] SIGNAL CONVERTER

[75] Inventors: Lawrence J. Zana, Wilkinsburg; Gerald A. Breakey, Penn Township, Westmoreland County, both of Pa.

[73] Assignee: Westinghouse Electric Corp., Pittsburgh, Pa.

[21] Appl. No.: 916,658

[22] Filed: Oct. 6, 1986

[51] Int. Cl.$^4$ .............................................. H03F 3/45
[52] U.S. Cl. ..................................... 330/69; 330/252
[58] Field of Search ................. 330/252, 69, 258, 261, 330/310, 311, 149, 9

[56] References Cited

U.S. PATENT DOCUMENTS

| | | | |
|---|---|---|---|
| 3,299,367 | 1/1967 | Howden | 330/104 |
| 3,872,395 | 3/1975 | Holland | 330/86 |
| 4,085,379 | 4/1978 | Kubach et al. | 330/69 |
| 4,087,758 | 5/1978 | Hareyama | 330/261 |
| 4,152,659 | 5/1979 | Gordon | 330/9 |
| 4,190,806 | 2/1980 | Wermuth | 330/51 |
| 4,320,351 | 3/1982 | Brown, Jr. et al. | 330/260 |
| 4,354,156 | 10/1982 | Kennedy | 324/228 |
| 4,429,282 | 1/1984 | Saari | 330/9 |
| 4,484,146 | 11/1984 | Naito | 330/69 |
| 4,527,128 | 7/1985 | Bittner et al. | 330/9 |
| 4,567,437 | 1/1986 | Hubbard | 324/237 |

Primary Examiner—Gene Wan

[57] ABSTRACT

A signal converter adapted for use in a nuclear fuel tube inspection system that inspects the inner diameter and outer diameter of the tubes by comparing their actual diameters to the corresponding nominal values and uses that comparison to reject or pass each fuel tube. The signal converter receives signals corresponding to the inner and outer diameters, adds those signals to inverted reference signals corresponding to the nominal values for the inner and outer diameters, shifts the difference signals by an appropriate level, and amplifies the difference signals. The amplified difference signals can be applied to an analog to digital converter and then supplied to a microprocessor for processing. The signal converter increases the resolution of the inspection system without reducing the range of signal levels that it can process.

14 Claims, 2 Drawing Sheets

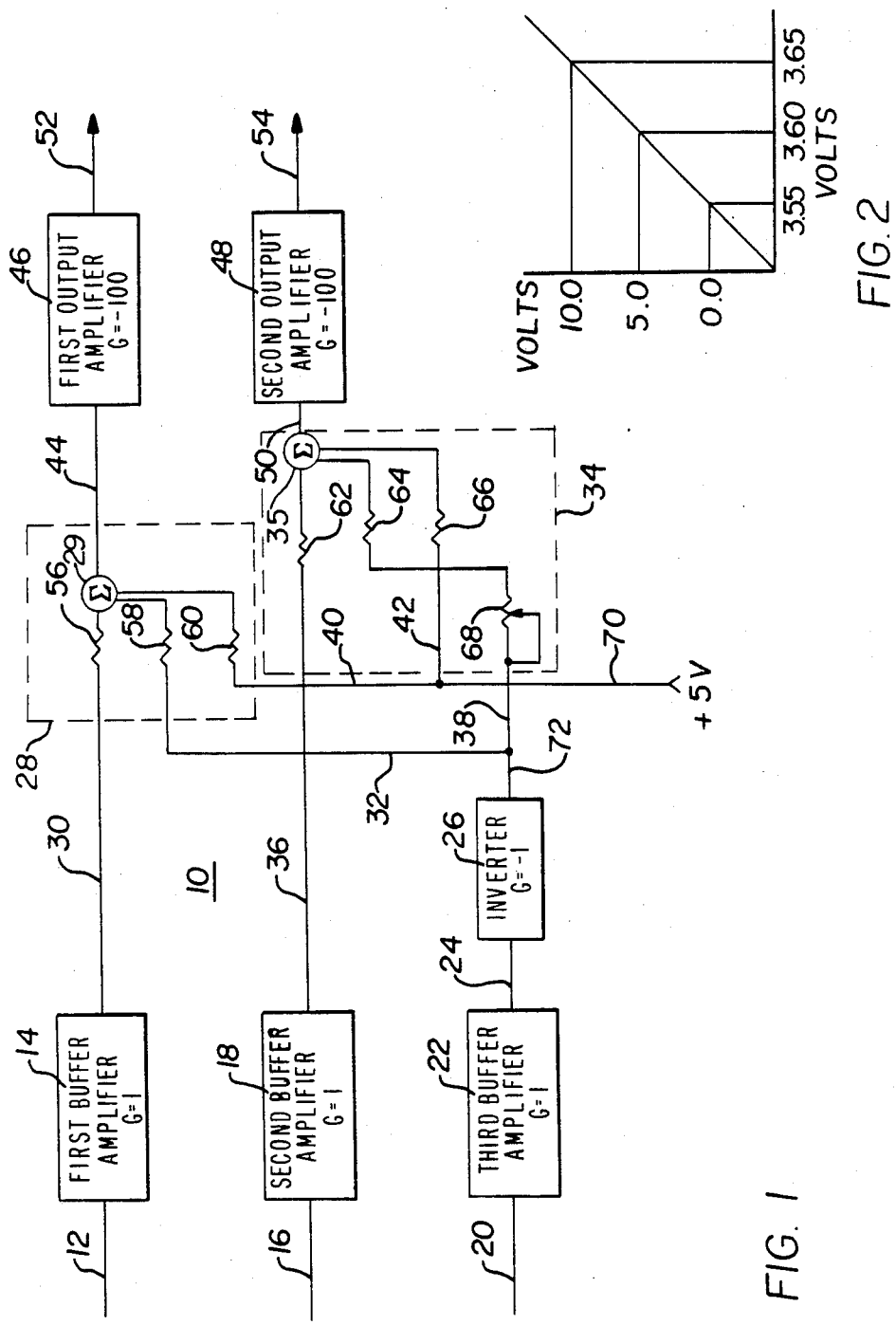

SIGNAL CONVERTER

BACKGROUND OF THE INVENTION

1. Field of the Invention

The present invention relates to signal processing, and more specifically to a signal converter that amplifies and offsets a signal related to the difference between the levels of two signals.

2. Description of the Prior Art

Computer based systems commonly are employed by automated inspection systems to acquire and process data. Often, the sensors employed by the inspection system produce an analog measurement signal, which is related to a measured parameter, that must be converted to digital signals by an analog to digital converter (referred to hereinafter as an "A/D converter") before the signals can be received and processed by the computer. Known inspection systems commonly use peak detection circuits to detect the peak of the signal to extract information pertaining to the value of the measured parameter. The detected peak is compared to a desired value for the parameter to determine whether the measured parameter falls within an acceptable range. Problems related to both resolution and signal to noise ratio exist in many such known inspection systems.

Usually, both the range of the levels of the analog signals that the converter can process and the resolution of the converter are fixed. A converter having a range of zero to ten volts operating with fourteen bits would provide a fixed system resolution of approximately 0.00061 volts per least significant bit (units per least significant bit will be referred to hereinafter as "units/bit"), which may not be the most desirable, or may be unacceptable, for some applications. For example, inspection systems commonly are used to inspect the inside diameter and the outside diameter (referred to hereinafter as "ID" and "OD", respectively) and the wall thickness of fuel tubes that will be used in nuclear power plants. One such inspection system employs ultrasonic sensors to determine the ID, OD, and wall thickness. Each fuel tube has an ID, OD, and wall thickness of a nominal value, that is, the value that the manufacturing process was intended to produce. The inspection system rejects any tube whose actual OD, ID, or wall thickness varies by more than a predetermined amount from its nominal values. Although the nominal value for the OD and ID of a fuel tube varies with the type of fuel tube undergoing inspection, the inspection must be able to inspect tubes with nominal values of up to one inch (2.54 centimeters). Therefore, the A/D converter must be able to receive signals from ultrasonic sensors that represent from zero to one inch (0.0 to 2.54 centimeters). A converter that is capable of receiving signals of a level from zero to ten volts representing zero to one inch (0.0 to 2.54 centimeters) and that operates on the basis of fourteen bits will provide a resolution of approximately 0.00061 volts per bit or approximately 0.000061 inches per bit (0.000155 centimeters/bit). Therefore, it is possible with such an inspection system to detect deviations from the nominal value of only $6.1 \times 10^{-5}$ inches, or 0.061 mils ($1.55 \times 10^{-4}$ centimeters). Considering the criticality of producing and using fuel tubes whose actual parameters deviate from their nominal values by as little as possible, it would be desirable to at least double, and, preferably, increase by a factor of 100, the resolution of the inspection system.

A further problem is caused by the noise injected into the signal by the system or environment, which may be greater than the desired resolution of the system. The peak detector employed by the system is, of course, very sensitive to any noise present in the signal. In many known inspection systems, the computer, the A/D converter and the peak detector receive the measurement signal from the system sensors through a relatively long cable. Thus, a great deal of noise is injected into the measurement signal by the cable before the signal reaches the peak detector. Since the peak detector is very sensitive to noise, system performance is degraded.

The resolution of the system could be improved, for example, doubled, by amplifying the analog measurement signal received from the ultrasonic sensors prior to applying it to the A/D converter. However, such an approach reduces by one half the signal levels that can be produced by the ultrasonic sensors and processed by the A/D converter, thus unacceptably limiting the dimensional range of the inspection system. Further, depending on where in the system noise is injected into the signal, the signal to noise ratio of the system could be further degraded since any noise present in the signal would be amplified along with the signal.

Accordingly, there is a need for a circuit that will increase the resolution of an inspection system without reducing the range of nominal values that can be inspected by the system, and that increases the signal to noise ratio of the system.

SUMMARY OF THE INVENTION

The present invention provides a signal converter. The converter is particularly useful in inspection systems. The signal converter increases the resolution of the system without reducing the range of signal levels that can be processed by the system and increases the signal to noise ratio of the system.

Briefly, the present invention provides a signal converter including a device for receiving a pair of signals and producing a difference signal related to the difference between the signals that is shifted by a predetermined level. The converter also includes a device for amplifying the shifted difference signal. The present invention provides a further signal converter including a device for inverting a reference signal and a device for receiving a measurement signal and the inverted reference signal and generating a signal related to the shifted and amplified sum of the inverted reference and measurement signals.

A further signal converter provided by the present invention can be used in a system that receives and processes two measurement signals. The signal converter includes a device for receiving a first measurement signal and a first reference signal, and producing a first difference signal related to the difference between the first measurement and first reference signals that is shifted by a predetermined level. The converter also includes a device for amplifying the first shifted difference signal. A device is provided for receiving a second measurement signal and a second reference signal and producing a second difference signal related to the difference between the second measurement and second reference signals that is shifted by a predetermined level. The converter also includes a device for amplifying the second shifted difference signal. Where the levels of the two reference signals are related, the second reference signal can be derived from the first reference signal, and in some cases can be proportional to the value of the first reference signal.

The present invention also provides a signal converter including an inverting amplifier that receives a reference signal and produces an inverted reference signal. A summing circuit is provided that receives the inverted reference signal and an offset signal, and produces a signal corresponding to the sum of the inverted reference signal, the offset signal and a measurement signal corresponding to a measured parameter. An amplifier receives and amplifies the difference signal. Where the inspection system inspects two parameters, and where the two parameters are related, a second summing circuit can be provided to receive the inverted reference signal and produce a second difference signal having a level corresponding to the sum of a fraction of the level of the reference signal, the level of the offset signal and a second measurement signal corresponding to a second measured parameter. A second amplifier receives and amplifies the second difference signal.

The present invention also provides a signal converter including a first buffer amplifier that receives a first DC signal derived from a first measured parameter. The first buffer amplifier produces a first measurement signal related to the first DC signal. A second buffer amplifier receives a second DC signal derived from a second measured parameter. The second buffer amplifier produces a second measurement signal related to the second DC signal. A third buffer amplifier receives a third DC signal derived from the desired value of the first measured parameter. The third buffer amplifier produces a reference signal related to the third DC signal. An inverting amplifier receives and inverts the reference signal and a circuit is provided for producing a DC offset signal of a predetermined level. A first summing circuit produces a first difference signal having a level related to the sum of the levels of the first measurement signal, the reference signal and the offset signal. A first output amplifier receives and amplifies the first difference signal. A second summing circuit produces a second difference signal having a level related to the sum of the level of the second measurement signal, the level of the offset signal and a fraction of the level of the reference signal. A second output amplifier receives and amplifies the second difference signal. Preferably, each difference signal is amplified by a factor of 100.

The present invention also provides a method of converting a signal that includes the steps of receiving a pair of signals, producing a signal related to the shifted difference between the signals and amplifying the shifted difference signal. The present invention also provides a method for converting a signal including the steps of inverting a reference signal, generating an offset signal, and producing a difference signal corresponding to the sum of the inverted reference signal, the offset signal, and a measurement signal corresponding to a measured parameter, and amplifying the difference signal.

It should be noted that the gain of the signal converter will determine the factor by which the gain of the system incorporating the converter will be increased. For example, incorporating a signal converter with a gain of two will double the resolution of a system incorporating the converter, and incorporating a converter with a gain of ten will multiply by ten the resolution of the system incorporating the converter. The preferred embodiment described below provides a gain of one hundred.

As is stated above, the computer, the A/D converter and the peak detector of many known inspection systems receive the measurement signal from the system sensors through a relatively long cable. Thus, a great deal of noise is injected into the measurement signal by the cable before the signal reaches the peak detector. Since the peak detector is very sensitive to noise, system performance is degraded. The signal converter provided by the present invention can be located in the general location of the system sensors. Thus, the signal converter transmits an amplified difference signal through the cable, and the signal to noise ratio of the system is enhanced.

BRIEF DESCRIPTION OF THE DRAWINGS

The invention may be better understood, and further advantages and uses thereof are readily apparent, when considered in view of the following detailed description of the preferred embodiments, taken with the accompanying drawing in which:

FIG. 1 is a block diagram of a preferred signal converter adapted for use with an inspection system that measures two related parameters;

FIG. 2 is a graphical representation of the relationship between the OD DC signal and the output of output amplifier 46.

DETAILED DESCRIPTION OF THE PREFERRED EMBODIMENTS

Figure 3:
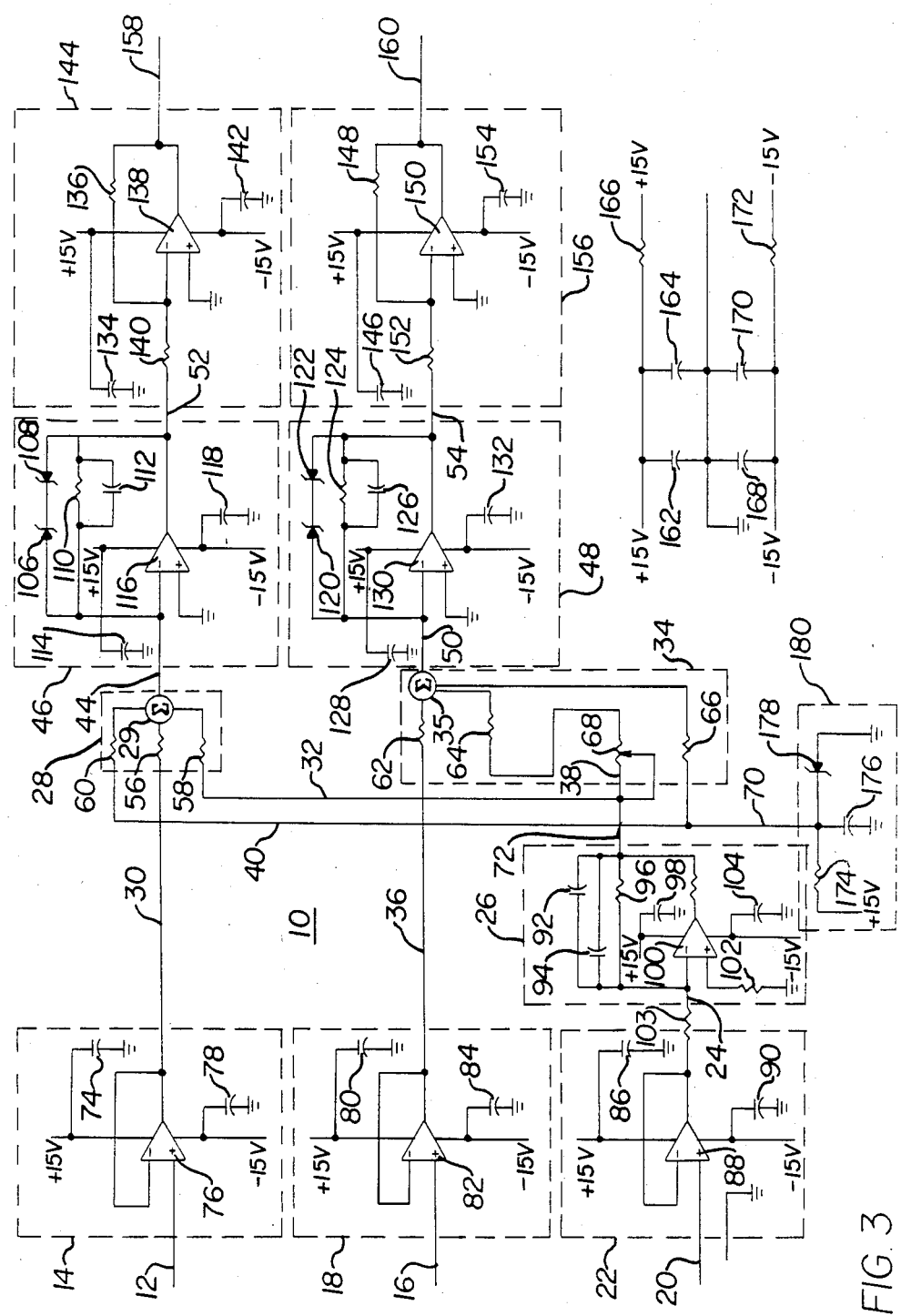
FIG. 3 is a circuit diagram of the system shown in FIG. 1.

The signal converter provided by the present invention is particularly useful for increasing the resolution and signal to noise ratio of an inspection system that measures two related parameters, where the expected difference between the measurement signals corresponding to the parameters and the reference signals corresponding to the nominal values of the parameters is small relative to the range of signal levels that can be processed by the system. For example, the fuel tube inspection system described above employs ultrasonic sensors and corresponding signal processing circuitry that inspects the OD, ID and wall thickness of fuel tubes. The processing circuitry produces substantially DC signals having a level from zero to ten volts that represent from zero to one inch (0.0 to 2.54 centimeters) of dimension. However, the expected difference between the nominal value of the parameter and the actual value for a fuel tube undergoing inspection is quite small compared to one inch (2.54 centimeters). Therefore, the signal converter provided by the present invention amplifies the difference between the nominal value and the actual measured value by a significant factor (2 or higher—100 for the preferred embodiment described below) and shifts the amplified difference toward the center of the range of the A/D converter used by the inspection system to prevent the amplified difference signal from exceeding one of the limits of the converter (which has a range of from zero to ten volts). To illustrate, FIG. 2 shows the relationship between the level of the signal corresponding to the actual OD measured value (the OD DC signal) and the output of the signal converter that corresponds to the actual OD signal, where the gain of the signal converter is 100 and the level of the OD nominal signal (the reference signal) is 3.60 volts. Thus, when the OD measurement signal, or OD DC signal, is 3.60 volts, the signal converter produces a signal with a level of 5.0 volts. When the level of the OD DC signal is 3.65 volts, the signal converter produces a signal with a level of 10.0 volts. When the level of the OD DC signal is 3.55 volts, the signal converter produces a signal with a level of 0.0 volts.

FIG. 1 shows signal converter 10, a preferred embodiment of the present invention. Signal converter 10 has been adapted for use in a fuel tube inspection system. The inspection system (not shown) employs ultrasonic sensors that produce signals of levels corresponding to the OD and ID of the nuclear fuel tubes undergoing inspection. The AC signals produced by the ultrasonic sensors are converted to, substantially, DC measurement signals having a level corresponding to the measured OD and ID parameters.

The OD DC signal, or OD measurement signal, is transmitted along line 12 to noninverting buffer amplifier 14. Buffer amplifier 14 has a gain of one. The ID DC signal, or ID measurement signal, is transmitted along line 16 to noninverting buffer amplifier 18. Buffer amplifier 18 has a gain of one. A zero to ten volt reference signal is transmitted along line 20 to noninverting buffer amplifier 22. Each of the OD, ID, and reference DC signals has a level falling in a range of zero to ten volts. The reference signal can be produced by a Kelvin-Varley decade switch and represents the nominal OD for the fuel tube under inspection. The buffered reference signal is transmitted along line 24 to inverting amplifier 26. Buffer amplifier 26 has a gain of minus one. The buffered OD signal and the buffered and inverted reference signal are transmitted to summing circuit 28 along line 30 and lines 72 and 32, respectively. The buffered ID signal and the inverted reference signal, which has a reduced level, are transmitted to summing circuit 34 along line 36 and lines 72 and 38, respectively. A nominal 5 volt offset signal is transmitted to summing circuit 28 along lines 70 and 40, and to summing junction 34 along lines 70 and 42. The offset signal is used to shift each amplified difference signal produced by converter 10 toward the center of the range of the A/D converter employed by the inspection system, to permit processing of an acceptable range of signal levels. Summing circuit 28 transmits a difference signal along line 44 to inverting output amplifier 46, which amplifies the difference signal on line 44. The difference signal appearing on line 44 represents the sum of the buffered OD signal on line 30, the inverted reference signal on line 32 and the offset signal on line 40. Summing circuit 34 transmits to output amplifier 48 along line 50 a difference signal corresponding to the sum of the buffered ID signal appearing on line 36, the inverted and reduced reference signal on line 38 and the offset signal on line 42. Output amplifier 48 amplifies the difference signal on line 50. The manner in which the gains of amplifiers 46 and 48 are established is presented in detail below. Also described in more detail below is the manner in which potentiometer 68 of summing circuit 34 is used to reduce the level of the inverted reference signal. The signals produced by output amplifiers 46 and 48 are transmitted along lines 52 and 54, respectively, to appropriate analog to digital converters via an appropriate peak detector circuit and inverting buffer amplifiers. The A/D converters convert the analog signals appearing on lines 52 and 54 to digital signals appropriate for processing by a microprocessor or computer. The microprocessor determines whether the deviations from the nominal values of the parameters represented by the signals on lines 12 and 16 are small enough to permit the fuel tube under inspection to pass the inspection test.

It should be noted that the difference signal on line 44 represents the difference between the OD signal appearing on line 12 and the reference signal appearing on line 20 and, thus, represents the difference between the nominal OD for the fuel tube under inspection and its actual OD. The difference signal on line 50 represents the difference between the ID signal on line 16 and a fraction of the reference signal on line 20, and, thus, represents the difference between the nominal ID for the fuel tube under inspection and its actual ID. Since both difference signals are amplified by a significant factor (100 for the preferred embodiment), the difference signals are shifted toward the center of the range of the A/D converter of the inspection system, using the offset signal, to increase the range of signal levels that can be processed by the system without violating the range limits of the A/D converter. The difference signals of the preferred embodiment are shifted by 5 volts since the A/D converter that receives the signals produced by converter 10 has a range of 0.0 to 10.0 volts.

Amplifiers 14, 18, and 22 are high input impedance amplifiers that reduce the loading of signal converter 10 on the portion of the inspection system that appears on the input to converter 10. Amplifiers 14, 18, and 22 are of low offset and low drift design to eliminate the need for offset trimming circuitry.

FIG. 3 shows the details of the circuits shown in FIG. 1. Each circuit shown in FIG. 1 is of a standard configuration and, thus, detailed explanation of the operation of each circuit in FIG. 3, generally, is not provided.

Capacitor 74, operational amplifier 76, and capacitor 78; capacitor 80, operational amplifier 82, and capacitor 84; and capacitor 86, operational amplifier 88, and capacitor 90 form conventional noninverting buffer amplifiers 14, 18, and 22, respectively. Capacitors 92, 94, 98, and 104, resistors 96, 102, and 103, and operational amplifier 100 form a conventional inverting amplifier 26. Zener diodes 106 and 108, capacitors 112, 114, and 118, resistor 110, and operational amplifier 116 form a conventional inverting output amplifier 46. Similarly, zener diodes 120 and 122, capacitors 126, 128 and 132, resistor 124, and operational amplifier 130 form a conventional inverting output amplifier 48.

Resistors 56, 58, and 60, and summing junction 29 form OD summing circuit 28. Since resistor 110 of amplifier 46 is 499K ohms, and resistors 56 and 58 are 5K ohms, amplifier 46 amplifies by about 100 the difference between the signals on lines 12 and 20. However, because resistor 60 is 499K ohms, the nominal 5 volt offset signal is, in effect, amplified by unity to provide an amplified difference signal shifted by the desired 5 volts. Resistors 56 and 58 of summing circuit 28 are of equal resistances to ensure that the output of output amplifier 46 is five volts when the OD signal on line 12 and the reference signal on line 20 are equal to each other. As the difference between those two signals increases, the output of amplifier 46 varies from five volts correspondingly. Resistors 62, 64, and 66, potentiometer 68, and summing junction 35 form summing circuit 34. Because resistor 66 is 499K ohms, the offset produced by amplifier 48 is the desired 5 volts. Again, the combination of the resistances of resistors 62, 64, and 68 cause amplifier 48 to amplify by about 100 the difference between the signals on lines 16 and 38. Resistors 62 and 64 are of equal resistance to ensure that the output of amplifier 48 is five volts when the signals on lines 16 and 38 are equal to each other. Potentiometer 68 is employed to adjust the reference voltage that is compared to the buffered ID signal on line 36 to an appropriate fraction of the reference signal appearing on line 20, to reflect the fact that the nominal ID of fuel tubes undergoing inspection is always a fraction less than the nominal value of the OD of the tubes. Potentiometer 68 can be adjusted to provide, within a limited range, the fraction by which the reference signal should be reduced. Larger adjustments can be made by providing potentiometer 68 and resistor 64 with appropriate resistance values. Alternatively, a CMOS switch can be used to select various combinations of resistances of potentiometers 68 and resistors 64 to permit switching among various fractions. The fraction of reduction employed by the preferred embodiment is 14%. Accordingly, amplifier 48 produces five volts on line 54 when the ID signal on line 16 is equal to 86% of the reference signal on line 20. As the ID signal appearing on line 16 varies from 86% of the reference signal on line 20, output amplifier 48 produces a signal of a corresponding level. Since the difference signals on lines 44 and 50 are amplified by a factor of 100, and since the range of the A/D converter that receives the signals on lines 158 and 160 is 0.0 to 10.0 volts, the levels of the difference signals must fall between plus or minus 0.0 and 0.05 volts.

Capacitors 134 and 142, resistors 136 and 140, and operational amplifier 138 form a conventional inverting amplifier 144. Similarly, capacitors 146 and 154, resistors 148 and 152, and operational amplifier 150 form a conventional inverting amplifier 156. Inverting amplifiers 144 and 156 invert the amplified OD and ID difference signals on lines 52 and 54, respectively, to place those signals in proper form for receipt by the A/D converters and produce those inverted signals on lines 158 and 160, respectively. Capacitors 162, 164, 168 and 170, and resistors 166 and 172 form a conventional on-board plus/minus power supply filter for signal converter 10. Resistor 174, capacitor 176, and zener diode 178 form a conventional nominal 5.0 volt supply that creates the nominal 5 volt offset signal on line 70.

It should be noted that in many known inspection systems, the computer, the A/D converter and the peak detector receive the measurement signal from the system sensors through a relatively long cable. Thus, a great deal of noise is injected into the measurement signal by the cable before the signal reaches the peak detector. Since the peak detector is very sensitive to noise, system performance is degraded. Signal converter 10 can be located where the system sensors create measurement signals. Thus, signal converter 10 transmits an amplified difference signal through the cable, and the signal to noise ratio of the system is enhanced.

What is claimed is:

1. A signal converter comprising:
    means for receiving a pair of signals, and producing an offset differential signal by offsetting the difference between said pair of signals by a preset offset; and
    means for providing an output of said offset differential signal.

2. A signal converter comprising:
    means for receiving a measurement signal and a reference signal that represents the expected value of the measurement signal;
    means for inverting the reference signal; and
    means for generating an offset signal by amplifying the sum of said inverted reference and measurement signals, offsetting said amplified sum by a predetermined value and providing an output thereof.

3. A signal converter comprising:
    means for receiving a first measurement signal and a first reference signal, and producing a first signal related to the difference between said first measurement and first reference signals that is offset by a preset offset;
    means for providing an output of said first signal;
    means for receiving a second measurement signal and a second reference signal, and producing a second signal related to the difference between said second measurement and said second reference signals that is offset by a preset offset; and
    means for providing an output of said second signal.

4. The signal converter recited by claim 3 wherein said second reference signal is derived from said first reference signal.

5. The signal converter recited by claim 4 wherein the value of said second reference signal is proportional to the value of said first reference signal.

6. The signal converter recited by claim 5 wherein the value of said second reference signal is about 86% of the value of said first reference signal.

7. A signal converter comprising:
    means for receiving a measurement signal;
    inverting amplifier means that receives a reference signal that represents the expected value of the measurement signal and produces an inverted reference signal;
    a summing circuit that receives said inverted reference signal, the measurement signal and an offset signal, and produces a signal corresponding to the sum of said inverted reference signal, said offset signal and the measurement signal corresponding to a measured parameter; and
    an amplifier that receives and amplifies said summed signal and produces an output thereof.

8. The signal converter recited by claim 7 further comprising:
    a second summing circuit that receives said inverted reference signal and produces a second difference signal having a level corresponding to the sum of the level of said offset signal, a fraction of the level of said reference signal and the level of a second measurement signal corresponding to a second measured parameter; and
    a second amplifier that receives and amplifies said second difference signal.

9. A signal converter comprising:
    a first buffer amplifier that receives a first DC signal derived from a first measured parameter, said first buffer amplifier producing a first measurement signal related to said first DC signal;
    a second buffer amplifier that receives a second DC signal derived from a second measured parameter, said second buffer amplifier producing a second measurement signal related to said second DC signal;
    a third buffer amplifier that receives a third DC signal derived from the expected value of said first measured parameter, said third buffer amplifier producing a reference signal related to said third DC signal;

an inverting amplifier that receives and inverts said reference signal;

circuit means for producing a DC offset signal of a predetermined level;

a first summing circuit that produces a first difference signal having a level related to the sum of the levels of said first measurement signal, said reference signal and said offset signal;

a first output amplifier that receives and amplifies said first difference signal;

a second summing circuit that produces a second difference signal having a level related to the sum of the level of said second measurement signal, the level of said offset signal, and a fraction of the level of said reference signal; and a second output amplifier that receives and amplifies said second difference signal.

10. The signal converter recited by claim 9 wherein each said difference signal is amplified by a factor of 100.

11. The signal converter recited by claim 9 wherein said fraction is 0.86.

12. A method of converting a signal comprising the steps of:

receiving a pair of signals, and producing an offset differential signal by offsetting the difference between said pair of signals by a preset offset; and amplifying said offset differential signal and providing an output thereof.

13. A method for converting a signal comprising the steps of:

receiving a measurement signal;

inverting a reference signal that represents the expected value of the measurement signal;

generating an offset signal;

producing a difference signal corresponding to the sum of the inverted reference signal, said offset signal, and the measurement signal corresponding to a measured parameter; and providing an output thereof.

14. A method for converting a signal comprising the steps of:

producing a first buffered measurement signal related to a first DC signal that is derived from a first measured parameter;

producing a second buffered measurement signal related to a second DC signal that is derived from a second measured parameter;

producing a reference signal related to a third DC signal derived from the nominal value of the first measured parameter;

inverting said reference signal;

producing a DC offset signal of a predetermined level;

producing a first difference signal having a level related to the sum of the levels of the first measurement signal, said reference signal and said offset signal;

amplifying said first difference signal;

producing a second difference signal having a level related to the sum of the level of said second measurement signal, the level of said offset signal, and a fraction of the level of said reference signal; and amplifying said second difference signal.

* * * * *